(12) United States Patent
Konicke et al.

(10) Patent No.: US 6,669,357 B2
(45) Date of Patent: Dec. 30, 2003

(54) SURFACE ILLUMINATION SYSTEM OF AN AIRCRAFT AND LIKE VEHICLES

(75) Inventors: Michael L. Konicke, Snohomish, WA (US); James E. Veitengruber, Bellevue, WA (US); C. Edward Wischmeyer, Redmond, WA (US)

(73) Assignee: The Boeing Company, Seattle, WA (US)

( * ) Notice: Subject to any disclaimer, the term of this patent is extended or adjusted under 35 U.S.C. 154(b) by 106 days.

(21) Appl. No.: 09/964,046

(22) Filed: Sep. 26, 2001

(65) Prior Publication Data

US 2003/0058653 A1 Mar. 27, 2003

(51) Int. Cl.[7] ................................. F21V 21/00
(52) U.S. Cl. .................. 362/470; 362/545; 340/815.75; 244/1 R
(58) Field of Search ................. 362/470, 540, 362/543, 459, 544, 545; 340/815.73–815.75, 815.78; 244/1 R, 1 A, 134 D

(56) References Cited

U.S. PATENT DOCUMENTS

| | | | |
|---|---|---|---|
| 2,832,059 A | * | 4/1958 | Adler, Jr. ................... 340/982 |
| 3,436,729 A | * | 4/1969 | Zurcher ..................... 340/982 |
| 3,903,501 A | * | 9/1975 | Greenlee et al. ........... 340/982 |
| 4,249,159 A | | 2/1981 | Stasko |
| 4,256,366 A | | 3/1981 | Buckelew |
| 4,299,442 A | | 11/1981 | Buckelew |
| 4,633,376 A | * | 12/1986 | Newman .................... 362/470 |
| 5,293,304 A | | 3/1994 | Godfrey |
| 5,416,672 A | | 5/1995 | Authier |
| 5,559,510 A | | 9/1996 | Strong, III et al. |
| 5,719,568 A | | 2/1998 | Adams |
| 5,813,744 A | | 9/1998 | Altebarmakian |
| 6,211,808 B1 | | 4/2001 | Rees |
| 6,244,728 B1 | | 6/2001 | Cote et al. |

* cited by examiner

Primary Examiner—Sandra O'Shea
Assistant Examiner—Ali Alavi
(74) Attorney, Agent, or Firm—Alston & Bird LLP

(57) ABSTRACT

A surface illumination system is provided that includes a lighting system mounted upon a vehicle body, such as an aircraft body. The lighting system is adapted to illuminate the surface beneath and around the periphery of the aircraft. For example, the lighting system is preferably adapted to illuminate the surface beneath at least one of the tail and distal ends of the wings. A further embodiment of the lighting system is adapted to illuminate the surface in a non-static manner. By increasing the illumination about the periphery of the aircraft, the surface illumination system draws increased attention to the aircraft and provides ground vehicles, taxiing aircraft, and landing aircraft advanced warning of the presence and position of obstacle aircraft on the ground, thereby reducing the possibility of collisions.

27 Claims, 5 Drawing Sheets

SURFACE ILLUMINATION SYSTEM OF AN AIRCRAFT AND LIKE VEHICLES

FIELD OF THE INVENTION

The present invention relates generally to vehicular lighting systems, and more particularly to lighting systems for illuminating the underlying and/or proximate surface for anticollision and other purposes.

BACKGROUND OF THE INVENTION

The threat of collisions between aircraft is a particularly serious concern for the aviation industry. Air traffic control reduces the possibility of collisions by separating aircraft during flight and maintaining safe distances between aircraft that are landing and other aircraft, either in the air or on the ground. Additionally, the principle of "see and be seen" provides a means to decrease the chance of a collision between aircraft. Many see and be seen navigational aid devices and systems make use of light to identify and draw attention to the presence and location of aircraft. Conventional light sources use incandescent and halogen lamps and light emitting diodes for illumination purposes.

Conventional aircraft external lighting systems typically comprise navigation lights, anti-collision lights, landing and taxi lights, recognition lights, and ice detection lights. Navigation lights include a red light on the left wingtip, a green light on the right wingtip, and a white light(s) visible from the rear of the aircraft, with the white lights being on the wingtips and/or the tail. Anti-collision lights include strobe lights at the wingtips and sometimes the tail, and red rotating or flashing beacons on the fuselage, with the red rotating beacons used to indicate that engines are running. Landing and taxi lights are forward facing white lights designed to illuminate pavement, but with taxi lights also used to show the crew's intention to taxi and landing lights used to indicate the crew's belief that they are cleared for takeoff. These are also used to make the aircraft more visible to observers in front of the airplane in both day and night conditions. Recognition lights are small floodlights that illuminate the sides of the vertical stabilizer and rudder. Ice detection lights illuminate the leading edge of the wing(s) so that the flight crew can see at night if ice is accumulating.

While conventional aircraft lighting systems are helpful, there is a continuing need for improvements in aircraft lighting systems to prevent collisions between aircraft on the ground and ground vehicles, taxiing aircraft, aircraft that are landing and aircraft that are taking off. In this regard, taxi lights, recognition lights, and ambient light have not been completely successful in some situations in preventing collisions with aircraft on the ground. For example, vehicles and other aircraft approaching from the side or from behind an aircraft on the ground and, similarly, landing aircraft approaching from the side or rear may not become aware of the presence of an aircraft. In these situations, the warning provided by conventional aircraft light systems has sometimes proved ineffective. Taxi lights are often not visible except from in front of an aircraft. Recognition lights often do not provide sufficient illumination to attract enough attention to prevent collisions.

It would therefore be advantageous to further reduce the possibility of collisions with an aircraft on the ground by providing an improved means for detecting aircraft on the ground by ground vehicles, taxiing aircraft, aircraft that are landing and aircraft that are taking off.

SUMMARY OF THE INVENTION

A surface illumination system is therefore provided that includes a lighting system mounted upon a vehicle body, such as an aircraft body. The lighting system is adapted to illuminate the surface beneath and/or around the periphery of the aircraft. For example, the lighting system is preferably adapted to illuminate the surface beneath at least one of the tail and distal ends of the wings. A further embodiment of the lighting system is adapted to illuminate the surface in a non-static manner. Preferably, the illumination pattern should be obviously and significantly different from illumination from building lights, floodlights, headlights or other types of lights within or near an airport such that the illumination pattern is uniquely identifiable as that generated by an aircraft. By increasing the illumination about the periphery of the aircraft, the surface illumination system draws increased attention to the aircraft and provides ground vehicles, taxiing aircraft, aircraft that are landing and aircraft that are taking off with advanced warning of the presence and position of the aircraft on the ground, thereby reducing the possibility of collisions.

A vehicle, such as an aircraft, equipped with a surface illumination system typically includes a light system, comprised of a plurality of light sources, for illuminating the ground in proximity to the aircraft. Radiance may occur in a generally downward direction so as to provide illumination of the ground directly beneath and, more importantly, proximate to and extending beyond the periphery of the aircraft. Advantageously, the light system provides illumination about a majority of the periphery of the vehicle. For an aircraft, the lights are preferably positioned to provide illumination under and around the nose, wingtips, and tail of an aircraft. Extending the area of ground illumination beyond the periphery of the aircraft allows landing aircraft to better view the illumination that otherwise would be difficult to see if only the ground directly beneath the aircraft was illuminated, which illumination could be partially blocked by the aircraft itself.

A light positioned at the front of the aircraft is advantageous when the aircraft is holding short of the runway. A light positioned at the tail of the aircraft is advantageous when the aircraft is holding in position on the runway to provide notice to vehicles or aircraft approaching from the rear. Lights positioned on the wingtips are also particularly advantageous while the aircraft is taxiing to provide a warning to vehicles or aircraft approaching from the side. Although the position of each light has a particular importance, the entire series of lights may be lit to increase the overall visibility of the aircraft and to decrease the chance of collisions with an aircraft.

One advantageous aspect of the surface illumination system is the use of variant, non-static, emissions from the lights. In order to draw attention to the presence, position and orientation of the obstacle aircraft, the plurality of lights may provide illumination that varies over time in any combination of size, shape, color, position, frequency, and intensity. Additionally, the sequence of illumination and/or the pattern of illumination may be varied.

The light sources of the present invention may be of any type such as incandescent or halogen lamps or light emitting diodes. The selection of light source may depend upon the competing desires of providing sufficient ground illumination without ruining the night vision in the aircraft or others in nearby vehicles or aircraft. These competing desires may be balanced by directing the light, maintaining a low level of intensity, or any other method.

Although a low level of intensity is advantageous so as not to obstruct the view of the pilots in the aircraft or others nearby, the intensity of light produced by the surface illumination system of the present invention should be sufficient to provide warning to other vehicles and aircraft. The surface illumination system is preferably able to attract attention from ground vehicles and taxiing aircraft at a few hundred yards. A visible range of about a mile is suggested to attract the attention of landing aircraft when the illuminating aircraft is holding for takeoff on the runway; while half a mile is suggested when holding on an adjacent taxiway.

Therefore, the surface illumination system of the present may decrease the chance of collisions with aircraft on the ground by providing increased illumination in the vicinity of the aircraft which, in turn, notifies others of the presence of the aircraft. In particular, the illumination of the surface beneath and around the aircraft, as well as a non-static manner of illumination, provides landing and taxiing aircraft and ground vehicles advanced warning of the presence of the illuminating aircraft on the ground.

BRIEF DESCRIPTION OF THE DRAWINGS

Figure 1:
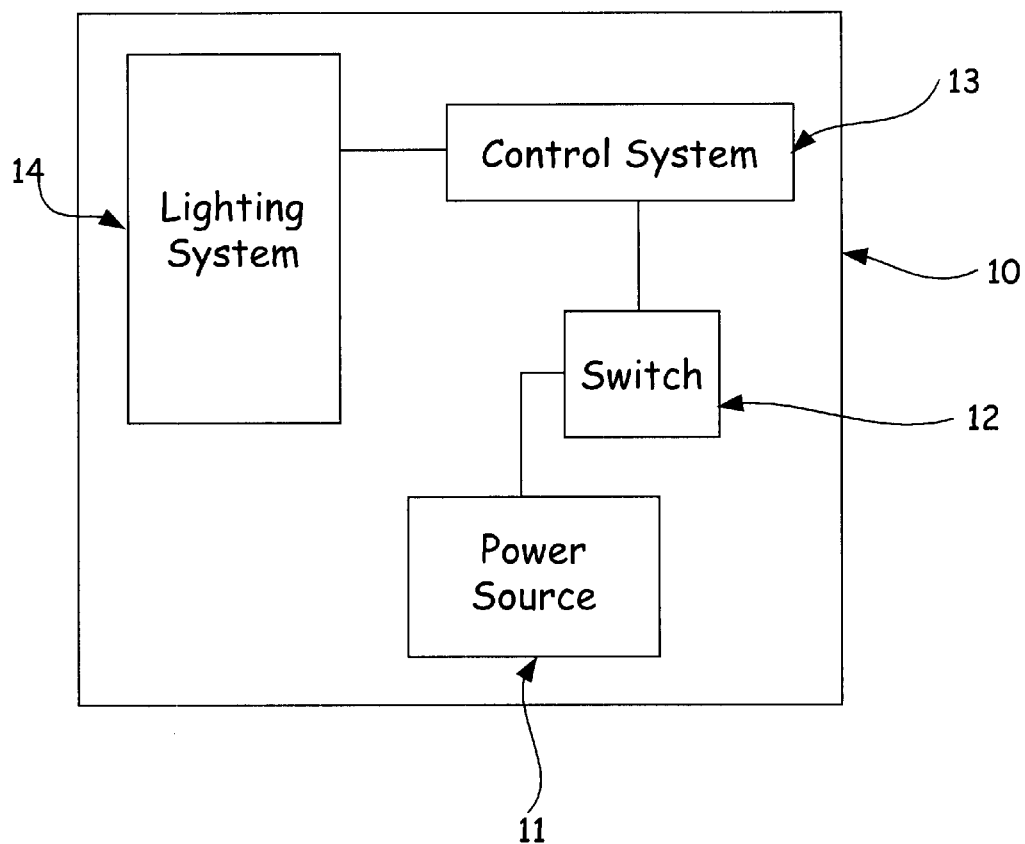
Figure 2:
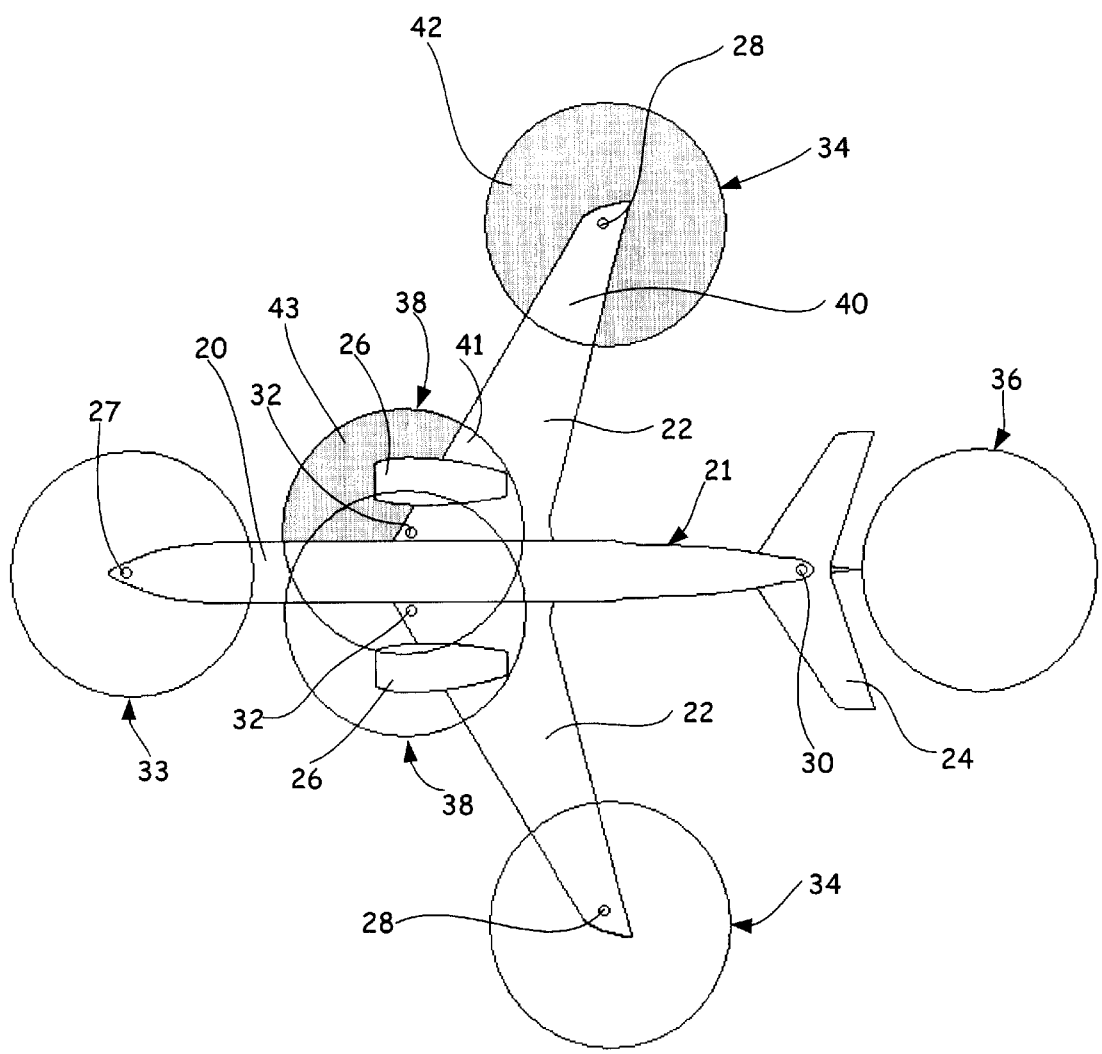
Figure 3:
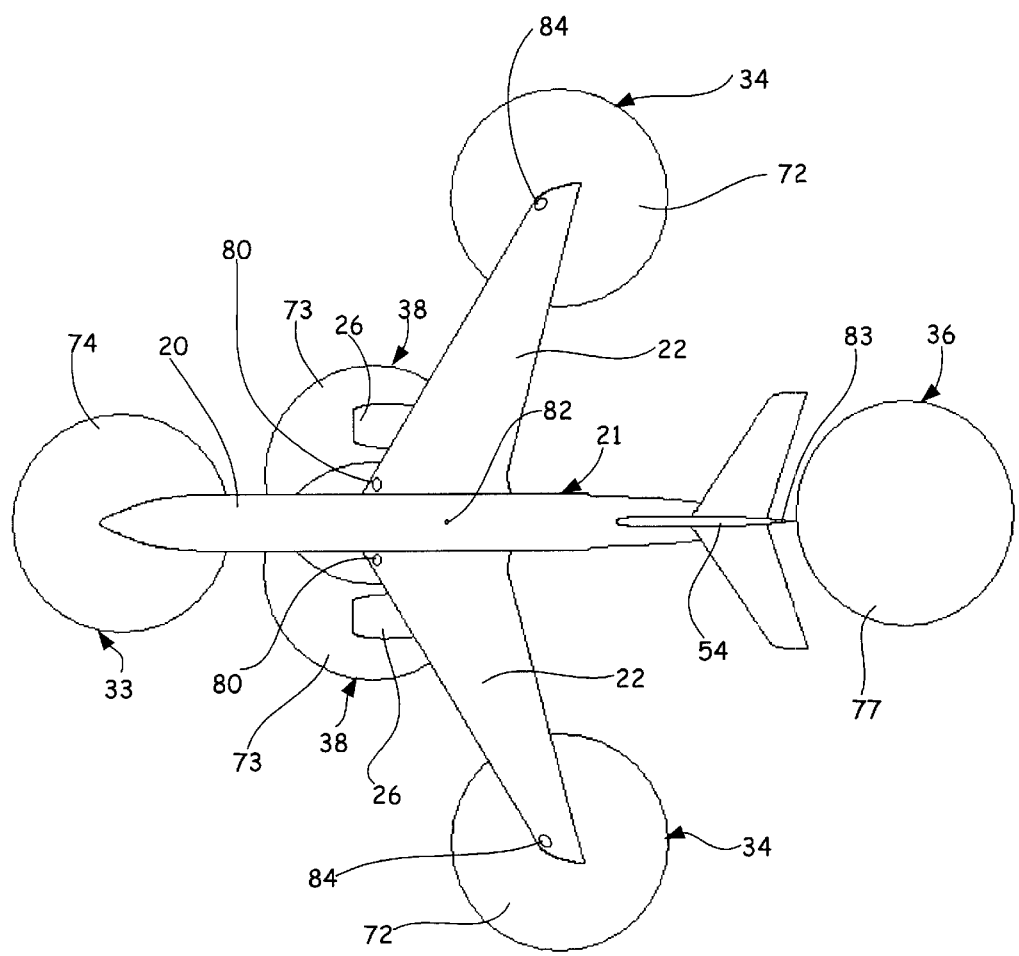
Figure 4:
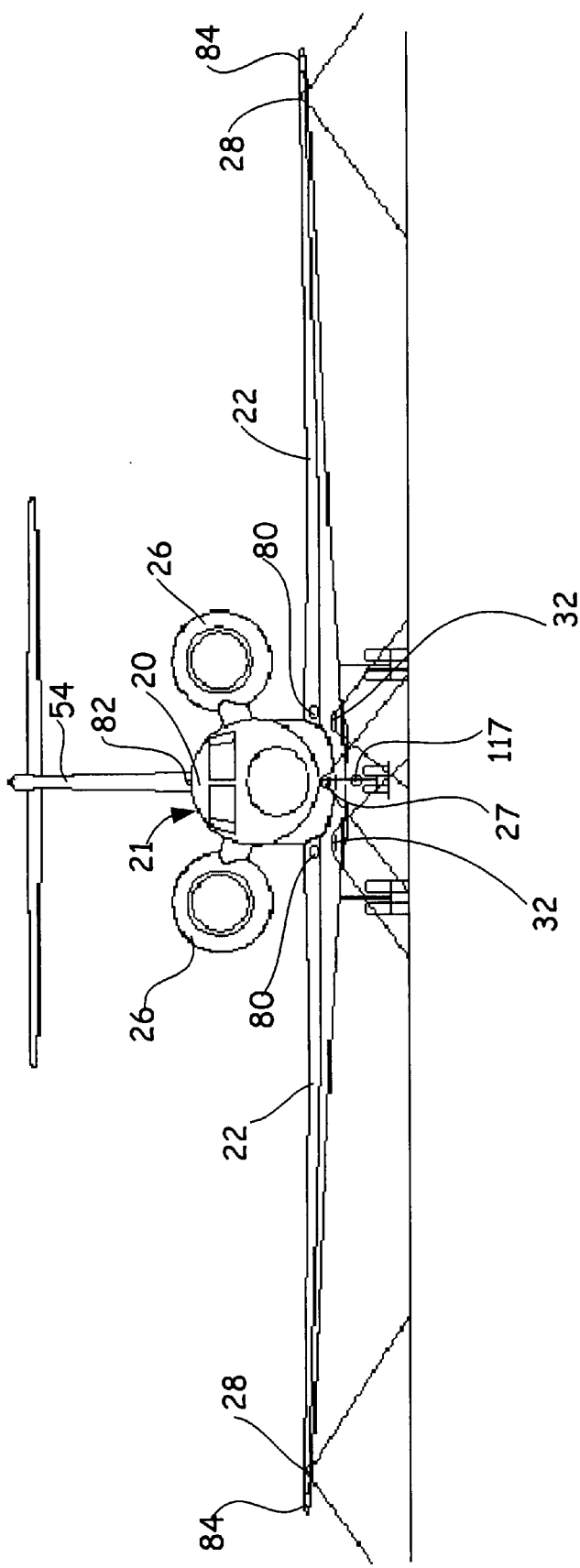
Figure 5:
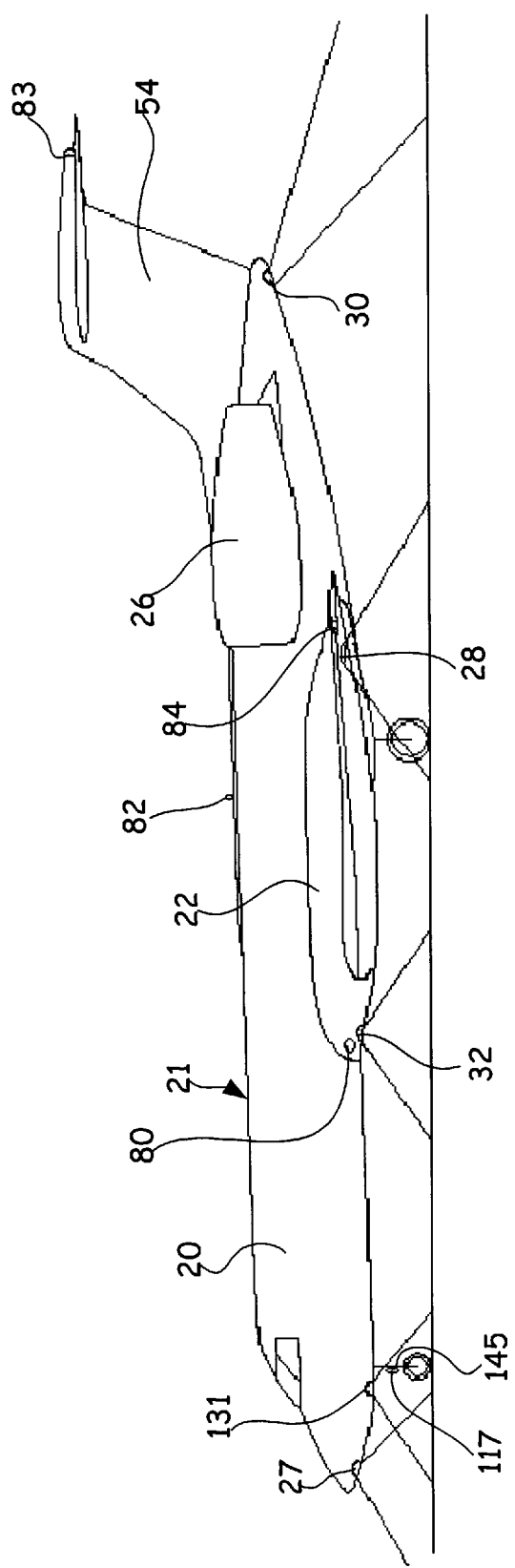

Having thus described the invention in general terms, reference will now be made to the accompanying drawings, which are not necessarily drawn to scale, and wherein:

FIG. 1 is a block diagram of a surface illumination system according to one embodiment of the present invention;

FIG. 2 is an underside view showing the illumination pattern produced by an aircraft equipped with a surface illumination system according to one embodiment of the present invention;

FIG. 3 is an overhead view of the aircraft of FIG. 2;

FIG. 4 is a frontal view of an aircraft equipped with a surface illumination system according to one embodiment of the present invention; and FIG. 5 is a side view showing the illumination pattern produced by the aircraft of FIG. 4.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a block diagram of a surface illumination system 10 according to one embodiment of the present invention is illustrated. Although the surface illumination system of the present invention can have other configurations or consist of different, fewer, or additional elements, the schematic representation of the surface illumination system of FIG. 1 will be described in more detail hereinbelow for purposes of illustration. Additionally, the surface illumination system will be hereinafter discussed in conjunction with an aircraft, although it should be understood that the surface illumination system may be utilized in conjunction with other vehicles.

Surface illumination system 10 generally includes a power source 11 which may be the same power source used for other exterior lights on the aircraft. The power source 11 is controlled by a switch 12 which may be either manually or automatically actuated to activate or deactivate the surface illumination system 10. Although not necessary, surface illumination system 10 may also include a control system 13 to provide control of the characteristic manner of illumination. As described in detail hereinafter, surface illumination system 10 also includes a lighting system 14 that is supplied power by the power source 11 and that operates under control of the switch 12 and, in some instances, the control system 13 so as to illuminate the surface.

A vehicle, such as an aircraft, typically an airplane or helicopter with an airplane 20 being depicted in FIG. 2, can be equipped with a surface illumination system 10 as described above and illustrated in FIG. 1. The typical airplane includes a pair of centrally mounted wings 22, an aft tail section 24, and at least one engine, depicted in FIG. 2 as a pair of wing-mounted engines 26. Configurations of aircraft differ incredibly, but the present invention may be adapted for any variation. Regardless of the configuration, the airplane 20 has a periphery 21 defined as the outside edge of the airplane body when the airplane is viewed from above.

The airplane 20 of FIG. 2 has a surface illumination system consisting of a plurality of light sources 27, 28, 30, 32, typically mounted on the underside of the body of the airplane. The typical light source is an incandescent or halogen lamp or a light emitting diode. However, any light source which produces electromagnetic radiation in the visible light spectrum can be utilized. The depicted embodiment shows each light source 27, 28, 30, 32 producing a downward conical illumination pattern such that the projection of the light upon the surface underlying the airplane creates a circular spot of light 33, 34, 36, 38. The surface beneath an aircraft may have unlimited variations but generally includes: ground, earth, terra, runway, tarmac, motorway, bridge surface, hanger floor, taxiway, and any other surface upon which an aircraft may rest or pass over.

The depicted lighting system is adapted to provide illumination of the surface underlying the airplane body 40, 41 and/or portions of the surface extending beyond the periphery of the aircraft body 42, 43. Typically, the light sources will be positioned to affect a desired illumination upon the surface and to provide increased advance notification to others of particularly vulnerable portions of the airplane, such as the extremities of the aircraft. The airplane 20 in FIG. 2 includes light sources positioned at the extremities and center of the airplane, that is, below the nose 27, the tail 30, the distal end of each wing 28, and on either side of the fuselage on the forwardly facing portion of each wing 32 proximate the fuselage. However, the light source may be positioned elsewhere upon the aircraft, if so desired. Regardless of their position, the light sources preferably illuminate the surface underlying the aircraft and extending somewhat beyond the periphery of the aircraft and, more preferably, illuminate the surface extending about a majority of the periphery of the aircraft.

FIG. 3 depicts an overhead view of the aircraft 20 equipped with a light system 14 of a surface illumination system 10 according to one embodiment of the present invention. In particular, the airplane 20 has the plurality of light sources 27, 28, 30, 32, as illustrated in FIG. 2, upon on the underside of the body of the airplane 20. As shown, the lighting system illuminates the surface underlying the aircraft and, when viewed from a position at least partially above the aircraft, illuminates the surface extending beyond a majority of the periphery of the aircraft. In particular, the lighting system of FIG. 3 advantageously illuminates the surface at the extremities and center of the airplane, that is, below the nose 74, the tail 77, the distal end of each wing 72 and on either side of the fuselage on the forwardly facing portion of each wing 73 proximate the fuselage.

In addition to the surface illumination system of the present invention, many components of conventional exterior lighting systems for airplanes are also depicted in FIG. 3. These conventional exterior lighting systems complement the surface illumination system while the aircraft is on the ground and generally provide the primary, if not the sole, exterior lighting while in flight since the surface illumination system is principally intended for use on the ground. The conventional exterior lighting system includes taxi lights 80, positioned on either side of the fuselage on the forwardly facing portion of the wings proximate the fuselage, to provide forward illumination. Conventional exterior lighting systems also include recognition and anticollision lights 82, 83, 84, positioned on the distal end of each wing 84, the aft portion 83 of the tail section 54 and on a medial portion of the fuselage 82, to establish the position of an airplane.

A frontal view of an airplane 20 with engines 26 mounted on either side of the aft section of the fuselage is depicted in FIG. 4. The airplane 20 is equipped with a surface illumination system according to one embodiment of the present invention. FIG. 4 further illustrates the manner in which each light source 27, 28, 32 is adapted to provide illumination of the surface underlying and extending beyond the periphery of the aircraft body. As described above, the airplane 20 in FIG. 4 includes light sources 27, 28, 32 positioned to illuminate the surface below the extremities and center of the airplane, that is, below the nose 27, the distal end of each wing 28, and on either side of the fuselage on the forwardly facing portions of each wing proximate the fuselage 27.

FIG. 5 depicts a side view of the airplane 20 of FIG. 4 which includes a surface illumination system according to the present invention. As described above, the plurality of light sources may be mounted on the underside of the airplane body so as to illuminate the surface underlying and extending beyond a majority of the periphery of the aircraft. Multiple light sources 27, 117, 131 are depicted below the nose of the airplane. Depending upon the desired illumination, the size and shape of the aircraft, and possibly other parameters, light sources may be positioned at any point on the aircraft and mounted in many ways. By illustration, the light source 131 located just in front of the forward landing gear 145 may be mounted or housed on the underside of the body of the airplane or inside the forward landing gear compartment. In addition or alternatively, the light sources may be mounted to other portions of the aircraft, such as the vertical stabilizer in order to give more height for the light sources illuminating to the rear of the aircraft.

The surface illumination system of the present invention is designed to increase the visibility of the vehicle, such as an aircraft, while on the ground. In particular, the surface illumination system preferably includes a light system that illuminates the surface to the side and rear of the aircraft, in addition to forward of the aircraft so that vehicles approaching from one side or the rear will more likely see the aircraft. In addition, by illuminating portions of the surface extending beyond a majority of the periphery of the aircraft, the aircraft will also be more visible from above, thereby alerting landing aircraft.

The surface illumination system may illuminate the surface underlying the aircraft and extending about the periphery of the aircraft by means of a light system that provides constant or static lighting that is readily identifiable as originating from the aircraft. In order to increase the visibility and notification provided by the surface illumination system, however, the surface illumination system may produce illumination that varies or is non-static, thereby drawing increased attention from others. For example, the size, shape and/or position of the pattern of illumination may be varied over time such as by alternately extending the pattern of illumination further and less far beyond the periphery of the aircraft. As a further example, the color, frequency and/or intensity of the light may be varied, such as by alternately illuminating the surface with light of different colors. While the foregoing examples are provided by way of illustration, the light produced by surface illumination systems of the present invention may vary in other manners, if so desired, with such variations generally controlled by the associated control system 13. For example, the sequence of illumination and/or the pattern of illumination may be varied. Regardless of the type of variations, however, the change of the light emission over time should draw increased attention to the aircraft, thereby even further avoiding collisions while on the ground.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. An aircraft comprising:
    an aircraft body having a periphery; and
    a lighting system mounted upon said aircraft body in order to illuminate at least a surface underlying said aircraft body, said lighting system adapted to illuminate the surface such that portions of the surface extending beyond a majority of the periphery of the aircraft body are also illuminated.

2. An aircraft according to claim 1 wherein said lighting system is adapted to illuminate in a downward direction.

3. An aircraft according to claim 1 wherein said lighting system comprises a plurality of light sources disposed at different positions.

4. An aircraft according to claim 1 wherein said lighting comprising a plurality of light sources mounted upon a downwardly facing surface of said aircraft body.

5. An aircraft according to claim 1 wherein said aircraft body also has a tail and opposing wingtips, and wherein said lighting system is adapted to illuminate the surface such that portions of the surface extending beyond the periphery of at least one of the tail and wingtips are also illuminated.

6. An aircraft according to claim 1 wherein said lighting system is adapted to illuminate the surface while the aircraft is on the ground.

7. An aircraft according to claim 1 wherein said lighting system is adapted to illuminate the surface in a non-static manner.

8. An aircraft according to claim 7 wherein said lighting system is adapted to illuminate the surface in a non-static manner with at least one of size, shape, color, position, frequency, and intensity of the light varying.

9. An aircraft comprising:
    an aircraft body having a periphery, said aircraft body also having a tail and opposing wingtips; and a lighting system mounted upon said aircraft body in order to illuminate at least a surface underlying said aircraft body, said lighting system adapted to illuminate the surface such that portions of the surface extending beyond the periphery of at least one of the tail and wingtips are also illuminated.

10. An aircraft according to claim 9 wherein said lighting system is adapted to illuminate in a downward direction.

11. An aircraft according to claim 9 wherein said lighting comprising a plurality of light sources disposed at different positions.

12. An aircraft according to claim 9 wherein said lighting comprising a plurality of light sources mounted upon a downwardly facing surface of said aircraft body.

13. An aircraft according to claim 9 wherein said lighting system is adapted to illuminate the surface while the aircraft is on the ground.

14. An aircraft according to claim 9 wherein said lighting system is adapted to illuminate the surface in a non-static manner.

15. An aircraft according to claim 14 wherein said lighting system is adapted to illuminate the surface in a non-static manner with at least one of size, shape, color, position, frequency, and intensity of the light varying.

16. A vehicle comprising:
a vehicle body having a periphery; and
a lighting system mounted upon said vehicle body in order to illuminate at least a surface underlying said vehicle body, said lighting system adapted to illuminate the surface such that portions of the surface extending beyond the periphery of the vehicle body are also illuminated, said lighting system also adapted to illuminate the surface in a non-static manner.

17. A vehicle according to claim 16 wherein said lighting system is adapted to illuminate in a downward direction.

18. A vehicle according to claim 16 wherein said lighting system comprising a plurality of light sources disposed at different positions.

19. A vehicle according to claim 16 wherein said lighting comprising a plurality of light sources mounted upon a downwardly facing surface of said vehicle body.

20. A vehicle according to claim 16 wherein said lighting system is adapted to illuminate the surface in a non-static manner in which the size of an illumination pattern varies.

21. A vehicle according to claim 16 wherein said lighting system is adapted to illuminate the surface in a non-static manner in which the shape of an illumination pattern varies.

22. A vehicle according to claim 16 wherein said lighting system is adapted to illuminate the surface in a non-static manner in which the color of an illumination pattern varies.

23. A vehicle according to claim 16 wherein said lighting system is adapted to illuminate the surface in a non-static manner in which the position of an illumination pattern varies.

24. A vehicle according to claim 16 wherein said lighting system is adapted to illuminate the surface in a non-static manner in which the frequency of an illumination pattern varies.

25. A vehicle according to claim 16 wherein said lighting system is adapted to illuminate the surface in a non-static manner in which the intensity of an illumination pattern varies.

26. A vehicle according to claim 16 wherein said vehicle is an aircraft.

27. A vehicle according to claim 26 wherein said lighting system is adapted to illuminate the surface while the aircraft is on the ground.

* * * * *